US012759409B2

(12) United States Patent
Park et al.

(10) Patent No.: US 12,759,409 B2
(45) Date of Patent: Oct. 13, 2026

(54) ELECTRIFIED VEHICLE AND REGENERATIVE BRAKING CONTROL METHOD THEREOF

(71) Applicants: HYUNDAI MOTOR COMPANY, Seoul (KR); KIA CORPORATION, Seoul (KR)

(72) Inventors: Sun Young Park, Ansan-si (KR); Jun Hyeong Jo, Cheongju-si (KR); Sung Deok Kim, Seongnam-si (KR); Sang Hyeok Mo, Incheon (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 16 days.

(21) Appl. No.: 18/944,787

(22) Filed: Nov. 12, 2024

(65) Prior Publication Data

US 2025/0332925 A1 Oct. 30, 2025

(30) Foreign Application Priority Data

Apr. 29, 2024 (KR) ........................ 10-2024-0057094

(51) Int. Cl.

| | |
|---|---|
| ***B60L 7/18*** | (2006.01) |
| ***B60K 35/22*** | (2024.01) |
| ***B60K 35/23*** | (2024.01) |
| ***B60K 35/26*** | (2024.01) |

(52) U.S. Cl.

CPC ................ *B60L 7/18* (2013.01); *B60K 35/22* (2024.01); *B60K 35/23* (2024.01); *B60K 35/26* (2024.01); *B60K 2360/139* (2024.01); *B60K 2360/167* (2024.01); *B60L 2240/12* (2013.01); *B60L 2240/26* (2013.01); *B60L 2240/46* (2013.01); *B60L 2240/62* (2013.01); *B60L 2240/642* (2013.01); *B60L 2240/68* (2013.01); *B60L 2250/26* (2013.01)

(58) Field of Classification Search

None

See application file for complete search history.

(56) References Cited

U.S. PATENT DOCUMENTS

| | | | | |
|---|---|---|---|---|
| 6,866,350 | B2 | 3/2005 | Palmer et al. | |
| 10,166,968 | B2 * | 1/2019 | Kim | B60W 20/12 |
| 2016/0318501 | A1 * | 11/2016 | Oldridge | B60W 20/12 |
| 2022/0114889 | A1 * | 4/2022 | Choi | G08G 1/096766 |

FOREIGN PATENT DOCUMENTS

| | | | |
|---|---|---|---|
| KR | 2017-0087647 | A | 7/2017 |
| KR | 10-2394838 | B1 | 5/2022 |
| KR | 2023-0090435 | A | 6/2023 |
| KR | 2023-0133994 | A | 9/2023 |

* cited by examiner

*Primary Examiner* — Abdhesh K Jha

(74) *Attorney, Agent, or Firm* — MCDONNELL BOEHNEN HULBERT & BERGHOFF LLP

(57) ABSTRACT

A vehicle and a control method thereof are capable of determining the presence of a downhill road and a deceleration zone ahead, determining the final regenerative braking torque based on the torque required for regenerative braking on the downhill road and deceleration zone, and performing regenerative braking based on the final regenerative braking torque.

15 Claims, 4 Drawing Sheets

ELECTRIFIED VEHICLE AND REGENERATIVE BRAKING CONTROL METHOD THEREOF

CROSS REFERENCE TO RELATED APPLICATIONS

The present application claims priority to Korean Patent Application No. 10-2024-0057094, filed Apr. 29, 2024, the entire contents of which is incorporated herein for all purposes by this reference.

BACKGROUND

Field of the Disclosure

The disclosure relates to a vehicle and a control method thereof capable of determining the torque required for regenerative braking in various situations and performing the regenerative braking accordingly.

Description of the Related Art

Electric vehicles and hybrid vehicles are eco-friendly vehicles equipped with an electric motor (drive motor) as a power source. During braking or coasting, these eco-friendly vehicles employ regenerative braking (RB) to recapture kinetic energy, convert it into electrical energy, and recharge the battery. This allows for improved fuel efficiency and efficient energy use through regenerative braking.

However, conventional eco-friendly vehicles solely rely on factors like required braking force, motor condition, and battery state to determine regenerative braking torque, disregarding the driving environment, including road type, slope, and distance from traffic signs.

The related art described above is intended merely to aid in the understanding of the background of the disclosure, and should not be construed as recognizing the prior art that is known to those skilled in the art.

This disclosure aims to provide a vehicle and a control method thereof capable of performing regenerative braking while taking into account the driving environment.

In particular, the disclosure aims to provide a vehicle and a control method thereof capable of determining the presence of a downhill road and a deceleration zone ahead, determining the final regenerative braking torque based on the torque required for regenerative braking on the downhill road and deceleration zone, and performing regenerative braking based on the final regenerative braking torque.

The information disclosed in this Background of the present disclosure section is only for enhancement of understanding of the general background of the present disclosure may not be taken as an acknowledgement or any form of suggestion that this information forms the related art already known to a person skilled in the art.

SUMMARY

In order to accomplish the above objects, a method for controlling regenerative braking of a vehicle according to an embodiment of the disclosure may include determining a first regenerative braking torque based on recognition of a downhill road, determining a second regenerative braking torque based on recognition of a deceleration driving zone ahead, determining a final regenerative braking torque as the larger of the first regenerative braking torque and the second regenerative braking torque, and performing regenerative braking based on the final regenerative braking torque.

For example, the determining of the first regenerative braking torque may include determining first regenerative braking entry conditions and determining the first regenerative braking torque based on the first regenerative braking entry conditions being satisfied.

For example, the determining of the first regenerative braking entry conditions may include determining whether the first regenerative braking entry conditions are satisfied based on at least one of whether a smart regenerative brake function is activated, whether the vehicle is coasting on a downhill road, whether a stop or acceleration signal is received, and whether the vehicle speed exceeds a predetermined target speed, the target speed being determined based on the vehicle speed at the time the brake pedal operation ceases.

For example, the determining of the first regenerative braking torque may include determining the first regenerative braking torque based on at least one of vehicle speed, vehicle wheel radius, vehicle weight, and slop of the downhill road.

For example, the determining of the second regenerative braking torque may include determining second regenerative braking entry conditions are satisfied, and determining the second regenerative braking torque based on the second regenerative braking entry conditions being satisfied.

For example, the determining of whether the second regenerative braking entry conditions are satisfied may include determining whether the second regenerative braking entry conditions are satisfied based on whether a sign is recognized.

For example, the determining of the second regenerative braking torque may include determining, based on a sign indicative of the deceleration zone ahead being recognized, the second regenerative braking toque until the vehicle reaches a location corresponding to the sign.

For example, the determining of the second regenerative braking torque until the vehicle reaches the location corresponding to the sign may include determining the second regenerative braking torque until the vehicle reaches the corresponding location, even after the sign is no longer recognized after being initially detected.

For example, the method may further include outputting information on the final regenerative braking torque through an output unit.

In order to accomplish the above objects, a vehicle according to an embodiment of the disclosure may include a drive motor connected to driving wheels, and a controller configured to determine whether a downhill road and a deceleration zone exists ahead, determine a first regenerative braking torque based on recognition of a downhill road and a second regenerative braking torque based on recognition of a deceleration zone ahead, determine a final regenerative braking torque as the larger of the first regenerative braking torque and the second regenerative braking torque, and control the drive motor based on the final regenerative braking torque.

For example, the controller may determine first regenerative braking entry conditions, and based on the first regenerative braking entry conditions being satisfied, determine the first regenerative braking torque.

For example, the controller may determine whether the first regenerative braking conditions are satisfied based on whether the first regenerative braking entry conditions are satisfied based on at least one of whether a smart regenerative brake function is activated, whether the vehicle is coasting on a downhill road, whether a stop or acceleration signal is received, and whether the vehicle speed exceeds a predetermined target speed, the target speed being determined based on the vehicle speed at the time the brake pedal operation ceases.

For example, the controller may determine the first regenerative braking torque based on at least one of vehicle speed, vehicle wheel radius, vehicle weight, and slop of the downhill road.

For example, the controller may determine whether second regenerative braking entry conditions are satisfied, and based on the second regenerative braking entry conditions being satisfied, determine the second regenerative braking torque.

For example, the controller may determine, based on a sign indicative of the deceleration zone ahead being recognized, the second regenerative braking toque until the vehicle reaches a location corresponding to the sign.

For example, the controller may determine the second regenerative braking torque until the vehicle reaches the corresponding location, even after the sign is no longer recognized after being initially detected.

For example, the vehicle according to an embodiment of the disclosure may further include an information collection device configured to collect information necessary for determining the first regenerative braking torque and the second regenerative braking torque, wherein the information collection device may include at least one of a camera, an incline sensor, a brake pedal, a vehicle speed sensor, and a navigation system.

For example, the vehicle according to an embodiment of the disclosure may further include an output device configured to output information on the final regenerative braking torque, wherein the output device may include at least one of a cluster, head-up display (HUD), a display device, and a speaker.

The disclosure is advantageous in terms of providing a vehicle and a control method thereof capable of determining the torque required for regenerative braking in various situations and performing the regenerative braking accordingly.

In particular, according to an embodiment, the vehicle is capable of determining the presence of a downhill road and a deceleration zone ahead, and determining the first regenerative braking torque based on the recognition of the downhill road and the second regenerative braking torque based on the recognition of the deceleration zone ahead. By utilizing this information, the final regenerative braking torque is determined as the larger between the first regenerative braking torque and the second regenerative braking torque, and control of the drive motor can be performed based on the final regenerative braking torque. In addition, information on the final regenerative braking torque can also be displayed through an output device.

The advantageous effects of the disclosure are not limited to the aforesaid, and other effects not described herein with can be clearly understood by those skilled in the art from the descriptions below.

DETAILED DESCRIPTION

Figure 1:
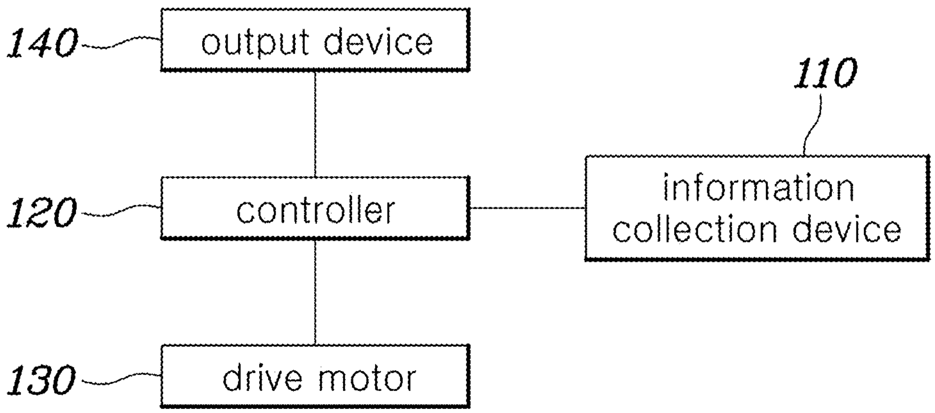
FIG. 1 is a diagram illustrating a configuration of a vehicle according to an embodiment of the disclosure.

The following provides a detailed description of the embodiments disclosed in this specification with reference to the attached drawings, assigning identical reference numerals to identical or similar components across the drawings and omitting redundant descriptions thereof. As used in the following description, the suffix “module” and “unit” are granted or used interchangeably in consideration of easiness of description but, by itself, having no distinct meaning or role. In addition, detailed descriptions of well-known technologies related to the embodiments disclosed in the present specification may be omitted to avoid obscuring the subject matter of the embodiments disclosed in the present specification. In addition, the accompanying drawings are only for easy understanding of the embodiments disclosed in the present specification and do not limit the technical spirit disclosed herein, and it should be understood that the embodiments include all changes, equivalents, and substitutes within the spirit and scope of the disclosure.

As used herein, terms including an ordinal number such as “first” and “second” can be used to describe various components without limiting the components. The terms are used only for distinguishing one component from another component.

As used herein, the singular forms are intended to include the plural forms as well, unless the context clearly indicates otherwise.

It will be further understood that the terms “comprises” or “has,” when used in this specification, specify the presence of a stated feature, number, step, operation, component, element, or a combination thereof, but they do not preclude the presence or addition of one or more other features, numbers, steps, operations, components, elements, or combinations thereof.

In addition, it should be noted that the terms “unit” or “control unit” found in the names of motor control units (MCUs) or similar devices are typically used to describe controllers responsible for specific functions of a vehicle, rather than indicating a generic function unit. For example, each controller may include a communication device communicating with another controller or sensor to control a function in charge, a memory that stores operating system or logic instructions and input/output information, and one or more processors for determination, operation, and decision-making necessary for functions in charge. Furthermore, the term “terminal” mentioned below may also have a configuration similar to that of a controller.

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments. On the contrary, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

An embodiment of the disclosure offers the advantage of providing a vehicle and a control method thereof capable of determining the torque required for regenerative braking in various situations and performing the regenerative braking accordingly.

In particular, according to an embodiment, the vehicle is capable of determining the presence of an uphill and a deceleration zone ahead, and determining the first regenerative braking torque based on the recognition of the uphill and the second regenerative braking torque based on the recognition of the deceleration zone ahead. By utilizing this information, the final regenerative braking torque is determined as the larger between the first regenerative braking torque and the second regenerative braking torque, and control of the drive motor can be performed based on the final regenerative braking torque. In addition, information on the final regenerative braking torque can also be displayed through an output device.

First, a description is made of the configuration of a vehicle applicable to the embodiments with reference to FIG. 1.

FIG. 1 is a diagram illustrating a configuration of a vehicle according to an embodiment of the disclosure.

It is assumed that the vehicle depicted in FIG. 1 is a hybrid electric vehicle (HEV). However, this is provided as an example for the convenience of explanation, and it is applicable not only to hybrid electric vehicles but also to electrified vehicles in the form of electric vehicles (EV).

With reference to FIG. 1, a vehicle according to an embodiment of the disclosure may include an information collection device 110, a controller 120, a drive motor 130 connected to drive wheels, and an output device 140. FIG. 1 merely shows the components essential to the description of an embodiment of the disclosure, and actual implementation of the vehicle may include more or fewer components than depicted.

Hereinafter, each of the components is described.

The information collection device 110 may include a camera, an incline sensor, a brake pedal, an accelerator pedal, a vehicle speed sensor, and a navigation system. However, this is illustrative and the actual implementation is not limited thereto.

The information collection device 110 may collect information about the road on which the vehicle is traveling, the condition of the vehicle traveling on that road, and information on the driver's acceleration or deceleration intentions.

For example, the information collection device 110 may recognize whether the road ahead, where the vehicle is traveling, is an downhill road via the incline sensor or navigation system, and when the road the vehicle is traveling on is an downhill road, may measure the slope of the downhill road, and even in cases where the road's slope changes abruptly due to road undulations, may measure the slope of the road in real-time. Additionally, the information collection device may recognize a sign installed on the road where the vehicle is traveling via the camera, thereby recognizing a deceleration zone ahead. These signs may include stop signs, yield signs, or speed limit signs. The information collection device may also collect information on the distance between a sign and the vehicle and information on the distance between the intersection where the sign is installed and the vehicle via the navigation system.

The information collection device may also collect information on the speed of the vehicle during regenerative braking and information on the driver's deceleration or acceleration intentions through brake pedals or accelerator pedals.

Meanwhile, the information collection device 110 may transmit the collected information to the controller 120.

The controller 120 may determine the presence of a downhill road ahead and a deceleration zone based on the information collected or recognized by the information collection device 110. Subsequently, the controller may determine the first regenerative braking torque based on the recognition of the downhill road and the second regenerative braking torque based on the recognition of the deceleration zone ahead. Next, the controller may determine the final regenerative braking torque as the larger of the first regenerative braking torque and the second regenerative braking torque, and control the drive motor 130 based on this final regenerative braking torque. The controller may also control the output device 140 to display information on the final regenerative braking torque.

Meanwhile, the controller 120 may include a disturbance observer (DOB) to effectively reflect disturbances such as road undulations in real-time and to accurately determine regenerative braking torque by continuously reflecting the collected information in real-time. A disturbance observer is one of the well-known robust control techniques in the field of control engineering, which observes or estimates the impact of model uncertainties and disturbances on the system and compensates for them.

A disturbance observer may be implemented as a physical or logical module within the controller 120, as a separate controller performing disturbance observation outside of the controller, or its functionality may be distributed across two or more controllers.

According to an embodiment, the controller 120 may be implemented as multiple controllers including one for determining regenerative braking torque and another for controlling the drive motor 130. For example, the controller dedicated to determining regenerative braking torque may include a hybrid control unit (HCU), while the controller responsible for controlling the drive motor 130 may include a motor control unit (MCU). However, this is provided as an example and does not necessarily limit the implementation.

Connected to the drive wheels, the drive motor 130 may perform vehicle propulsion and regenerative braking, executing regenerative braking under the control of the controller 120 by implementing the final regenerative braking torque determined by the controller 120.

Meanwhile, the output device 140 may output information on the final regenerative braking torque under the control of the controller 120. The output device 140 may include a cluster, head-up display (HUD), display device, and speaker.

According to an embodiment, the output device 140 may be implemented as a function of the audio/video/navigation (AVN) system equipped in the vehicle. However, this is illustrative and does not necessarily limit the implementation.

Based on the foregoing vehicle configuration, the regenerative braking method of the disclosure will be described hereinafter.

Figure 2:
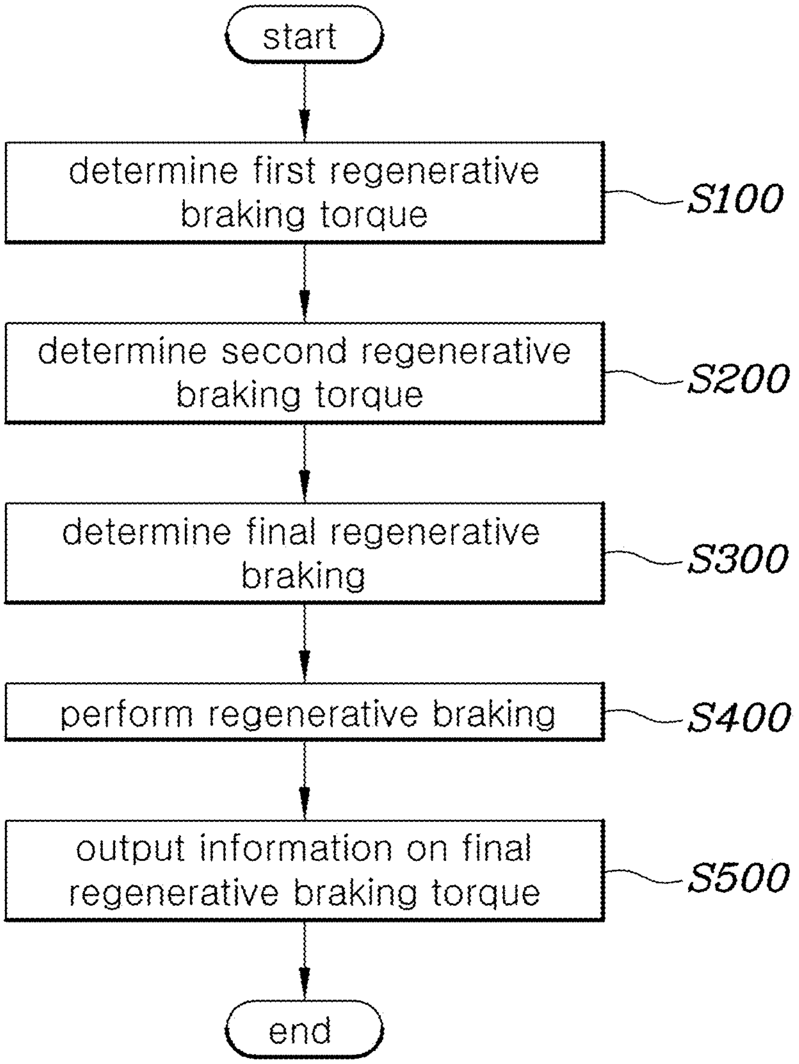
FIG. 2 is a flowchart illustrating the operation of a vehicle performing regenerative braking according to an embodiment of the disclosure.

FIG. 2 is a flowchart illustrating the operation of a vehicle performing regenerative braking according to an embodiment of the disclosure.

In the following description, it is assumed that the vehicle determines the second regenerative braking torque after determining the first regenerative braking torque. However, this is only for the convenience of explanation, and it is also possible that the first and second regenerative braking torque are determined simultaneously or that the second regenerative braking torque is determined before the first regenerative braking torque determination.

With reference to FIG. 2, the controller 120 may determine the first regenerative braking torque at step S100.

For example, the controller 120 may recognize a downhill road and determine whether the conditions for the first regenerative braking torque are met through the process to be described with reference to FIG. 3, and then determine the first generative braking torque based on the information necessary for the first regenerative braking torque determination.

Next, the controller 120 may determine the second regenerative braking torque at step S200.

For example, the controller 120 may identify a deceleration zone ahead by recognizing a sign and determine whether the conditions for the second regenerative braking torque are met through the process to be described with reference to FIG. 4, and then determine the second regenerative braking torque based on the information collected necessary for determining the second regenerative braking torque.

Next, the controller 120 may determine the larger of the first regenerative braking torque and the second regenerative braking torque as the final regenerative braking torque at step S300.

When the two determined regenerative braking torques are equal, the controller 120 may determine either the first regenerative braking torque or the second regenerative braking torque as the final regenerative braking torque. In this case, the first regenerative braking torque may be prioritized as the final regenerative braking torque.

Next, based on the final regenerative braking torque, regenerative braking can be performed at step S400.

The controller 120 may control the drive motor 130 connected to the drive wheels based on the final regenerative braking torque to perform regenerative braking.

In addition, information on the final regenerative braking torque may be displayed at step S500.

In more detail, information on the final regenerative braking torque may include the numerical value (e.g., 20 kgf·m) determined by the controller 120 of the vehicle and may be expressed numerically with levels or stages based on the maximum regenerative braking torque achievable by the drive motor 130 and the currently applied regenerative braking torque. However, this is merely illustrative and does not necessarily limit the implementation.

To achieve this, the controller 120 may control the output device 140 to ensure that information on the final regenerative braking torque is output through the output device 140.

The output device 140 may include a cluster, HUD, display device, and vibration device.

For example, the output device 140 may visually display information on the final regenerative braking torque through the cluster, HUD, and display device, and also output information audibly using the speaker. However, this is merely illustrative and does not necessarily limit the implementation.

Hereinafter, the process of determining the first generative braking torque is described with reference to FIG. 3.

Figure 3:
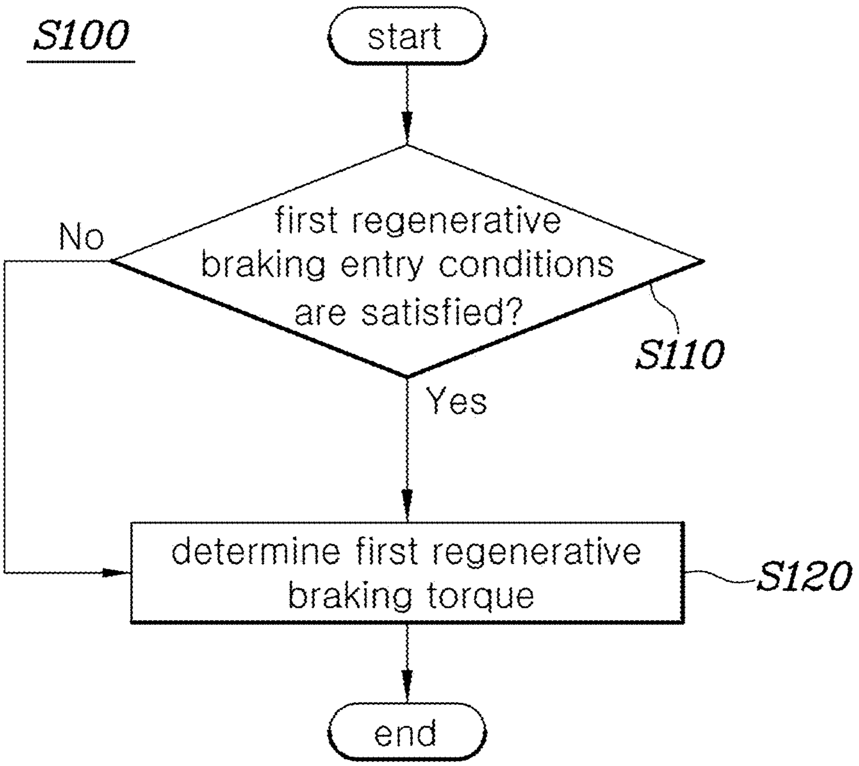
FIG. 3 is a flowchart illustrating the process of determining a first regenerative braking torque according to an embodiment of the disclosure.

FIG. 3 is a flowchart illustrating the process of determining a first regenerative braking torque at step S100 according to an embodiment of the disclosure.

With reference to FIG. 3, the controller 120 may determine at step S110 whether the first regenerative braking entry conditions are met.

The first regenerative braking entry conditions may include at least one of activation of the smart regenerative braking function, detection of driving on a downhill road, presence of a stop or acceleration signal, or whether the vehicle speed exceeds a predetermined target speed.

Based on the first regenerative braking entry conditions, the controller 120 may determine whether the vehicle satisfies the first regenerative braking entry conditions. For example, when the smart regenerative braking function of the vehicle is activated, the vehicle is driving on a downhill road, the driver is not manipulating the brake pedal or accelerator pedal (indicating no stop or acceleration signal), and the vehicle speed exceeds the predetermined target speed, the controller 120 may determine that the first regenerative braking entry conditions are satisfied.

Here, the target speed may refer to the desired speed to be reached as a result of regenerative braking, and the target speed may be determined based on the vehicle speed at the moment brake pedal is released. For example, the controller 120 may determine the vehicle speed at the moment brake pedal is released as the target speed.

When coasting downhill road, the vehicle may accelerate due to gravity, causing the vehicle speed to increase. The driver may apply the brake pedal while coasting downhill to decelerate until the vehicle reaches the desired speed, at which point the driver may stop applying the brake pedal. When the target speed is determined based on the vehicle speed at the moment when the brake pedal is released, regenerative braking may prevent the vehicle speed from increasing further and maintain a constant speed, thereby mitigating the sensation of unfamiliarity experienced by the driver when the vehicle speed increases beyond the desired speed while coasting downhill.

The controller 120 may determine the first regenerative braking torque at step S120.

As described above, the controller 120 may determine the first regenerative braking torque based on the information necessary for determining the first regenerative braking torque.

The information necessary for determining the first regenerative braking torque may include at least one of vehicle speed, vehicle wheel radius, vehicle weight, or downhill slope, and the information necessary for determining the first regenerative braking torque may be collected using the information collection device 110 and may be estimated. For example, the vehicle speed and downhill slope may be collected using the information collection device 110, while the vehicle weight may be determined based on an estimated value. In particular, when the vehicle is towing a camper, the vehicle weight may be determined based on estimated values.

In particular, the controller 120 may determine the first regenerative braking torque by reflecting the real-time changing external environment through feedback control using disturbance observers. For example, the controller 120 may determine the first regenerative braking torque in real-time by reflecting even sudden changes in the incline of the downhill road surface, such as road bumps.

Hereinafter, the process of determining the second generative braking torque is described with reference to FIG. 4.

Figure 4:
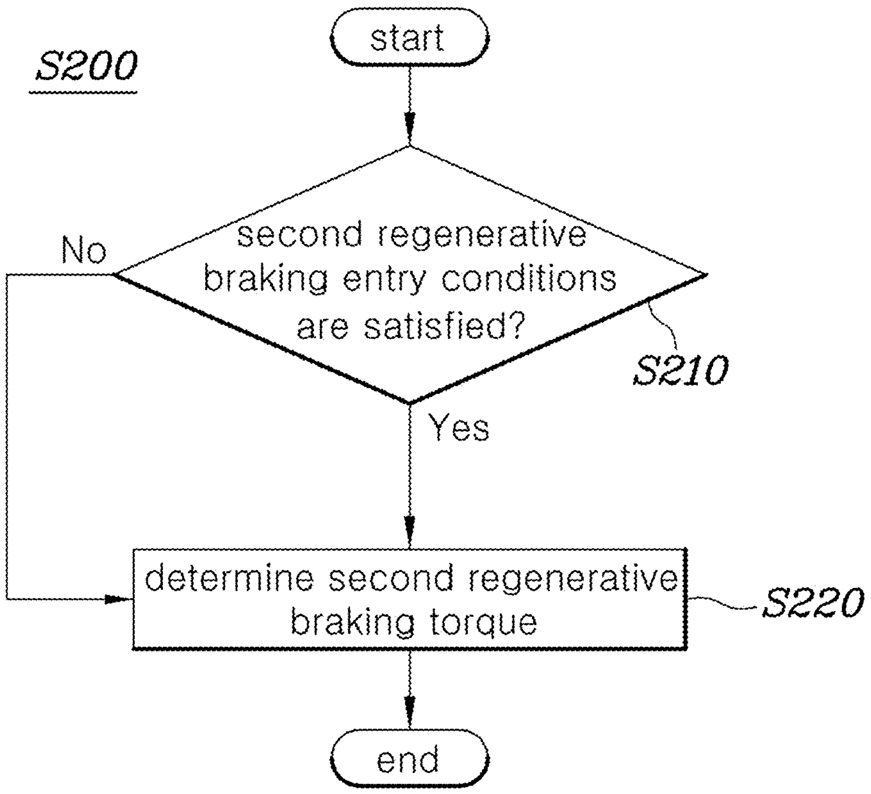
FIG. 4 is a flowchart illustrating the process of determining a second regenerative braking torque according to an embodiment of the disclosure.

FIG. 4 is a flowchart illustrating the process of determining a second regenerative braking torque at step S200 according to an embodiment of the disclosure.

With reference to FIG. 4, the controller 120 may determine at step S210 whether the second regenerative braking entry conditions are met.

The second regenerative braking entry conditions may include the recognition of a road sign.

Based on the second regenerative braking entry conditions, the controller 120 may determine whether the vehicle satisfies the second regenerative braking entry conditions. For example, the controller 120 may determine that the second regenerative braking entry conditions are satisfied when a sign corresponding to a deceleration zone ahead is recognized. In this case, the sign may include at least one of a stop sign, a yield sign, or a speed limit sign.

The controller 120 may determine the second regenerative braking torque at step S220.

As described above, the controller 120 may determine the second regenerative braking torque based on the information necessary for determining the second regenerative braking torque.

The information necessary for determining the second regenerative braking torque may include at least one of the distance between the vehicle and the sign, the distance between the vehicle and the intersection, the distance between the vehicle and the turning path, and whether the acceleration signal is present. As described above, the information collection device 110 may be used to collect the information necessary for determining the second regenerative braking torque. For example, the camera included in the information collection device 110 may recognize road signs, and the navigation system included in the information collection device 110 may gather information on the distance between the vehicle and the sign and the distance between the vehicle and the intersection or turning path where the sign is installed.

For example, the controller 120 may determine the second regenerative braking torque while recognizing the road sign. In the case where a road sign is recognized through the camera of the information collection device 110, the second regenerative braking torque may be determined to ensure that deceleration driving is performed while the road sign is being recognized through the camera.

For example, the controller 120 may determine the second regenerative braking torque until the vehicle reaches the location corresponding to the road sign even after the sign is no longer recognized after being initially detected. Here, the location corresponding to the road sign may refer to either the physical location where the sign itself is installed (e.g., the position where the distance between the vehicle and the sign is zero) or the intended target location for deceleration based on the sign's information (e.g., where the vehicle reaches the nearest turning path or intersection).

In more detail, even though the road sign is no longer recognized after being initially detected due to reasons such as being obscured by other vehicles, the controller 120 may determine the second regenerative braking torque based on the distance between the vehicle and the sign, enabling deceleration driving until the vehicle reaches the location corresponding to the sign. In the absence of the information on the distance between the vehicle and the road sign, the controller 120 may determine the second regenerative braking torque based on the distance information between the vehicle and the intersection or turn point where the sign is installed, enabling deceleration driving until the vehicle reaches the location corresponding to the sign. Meanwhile, when receiving an acceleration signal indicating the driver's intention to accelerate, the controller 120 may suspend the determination of the second regenerative braking torque, preventing the vehicle from decelerating further.

Through this process, even when the road sign is no longer recognized after being initially detected, the controller may effectively perform deceleration driving by continuing to determine the second regenerative braking torque.

Meanwhile, the disclosure may be implemented as code recorded on a computer-readable medium. A computer-readable medium includes all types of storage devices on which data readable by a computer system can be stored. Examples of the computer-readable media include Hard Disk Drive (HDD), Solid State Disk (SSD), Silicon Disk Drive (SDD), ROM, RAM, CD-ROM, magnetic tape, floppy disk, optical data storage device, etc.

The foregoing descriptions of specific exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the present disclosure and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

The invention claimed is:

1. A method for controlling regenerative braking of a vehicle, the method comprising:

determining, by a controller, a first regenerative braking torque based on recognition of a downhill road;

determining a second regenerative braking torque based on recognition of a deceleration driving zone ahead;

determining a larger of the first regenerative braking torque and the second regenerative braking torque as a final regenerative braking torque; and performing regenerative braking based on the final regenerative braking torque;

wherein determining the first regenerative braking torque comprises:

determining first regenerative braking entry conditions; and determining the first regenerative braking torque based on the first regenerative braking entry conditions being satisfied;

wherein determining the first regenerative braking entry conditions includes:

determining whether the first regenerative braking entry conditions are satisfied based on at least one of whether a smart regenerative brake function is activated, whether the vehicle is coasting on a downhill road, whether a stop or acceleration signal is received, and whether the vehicle speed exceeds a predetermined target speed; and wherein the target speed is determined based on the vehicle speed at a time when brake pedal operation ceases.

2. The method of claim 1, wherein determining the first regenerative braking torque includes:

determining the first regenerative braking torque based on at least one of vehicle speed, vehicle wheel radius, vehicle weight, and slope of the downhill road.

3. The method of claim 1, wherein determining the second regenerative braking torque includes:

determining second regenerative braking entry conditions are satisfied; and determining the second regenerative braking torque based on the second regenerative braking entry conditions being satisfied.

4. The method of claim 3, wherein determining whether the second regenerative braking entry conditions are satisfied includes:

determining whether the second regenerative braking entry conditions are satisfied based on whether a sign is recognized.

5. The method of claim 1, wherein determining the second regenerative braking torque includes:

determining, based on a sign indicative of the deceleration driving zone ahead being recognized, the second regenerative braking torque until the vehicle reaches a location corresponding to the sign.

6. The method of claim 5, wherein determining the second regenerative braking torque until the vehicle reaches the location corresponding to the sign includes:

determining the second regenerative braking torque until the vehicle reaches the corresponding location, even after the sign is no longer recognized after being initially detected.

7. The method of claim 1, further comprising outputting information on the final regenerative braking torque through an output unit.

8. A vehicle comprising:

a drive motor connected to driving wheels; and a controller configured to determine whether a downhill road and a deceleration zone exists ahead, determine a first regenerative braking torque based on recognition of the downhill road and a second regenerative braking torque based on recognition of the deceleration zone ahead, determine a larger of the first regenerative braking torque and the second regenerative braking torque as a final regenerative braking torque, and control the drive motor based on the final regenerative braking torque;

wherein the controller is configured to determine first regenerative braking entry conditions, and based on the first regenerative braking entry conditions being satisfied, is configured to determine the first regenerative braking torque; and wherein the controller is further configured to determine whether the first regenerative braking conditions are satisfied based on whether the first regenerative braking entry conditions are satisfied based on at least one of whether a smart regenerative brake function is activated, whether the vehicle is coasting on a downhill road, whether a stop or acceleration signal is received, and whether the vehicle speed exceeds a predetermined target speed, the predetermined target speed being determined based on the vehicle speed at a time when brake pedal operation ceases.

9. The vehicle of claim 8, wherein the controller is configured to determine the first regenerative braking torque based on at least one of vehicle speed, vehicle wheel radius, vehicle weight, and slope of the downhill road.

10. The vehicle of claim 8, wherein the controller is configured to determine whether second regenerative braking entry conditions are satisfied, and based on the second regenerative braking entry conditions being satisfied, to determine the second regenerative braking torque.

11. The vehicle of claim 10, wherein the controller is configured to determine whether the second regenerative braking entry conditions are satisfied based on whether a sign is recognized.

12. The vehicle of claim 8, wherein the controller is configured to determine, based on a sign indicative of the deceleration zone ahead being recognized, the second regenerative braking torque until the vehicle reaches a location corresponding to the sign.

13. The vehicle of claim 12, wherein the controller is configured to determine the second regenerative braking torque until the vehicle reaches the corresponding location, even after the sign is no longer recognized after being initially detected.

14. The vehicle of claim 8, further comprising:

an information collection device configured to collect information necessary for determining the first regenerative braking torque and the second regenerative braking torque;

wherein the information collection device comprises at least one of a camera, an incline sensor, a brake pedal, a vehicle speed sensor, and a navigation system.

15. The vehicle of claim 8, further comprising an output device configured to output information on the final regenerative braking torque, wherein the output device comprises at least one of a cluster, head-up display (HUD), a display device, and a speaker.

* * * * *